(12) United States Patent
Mak et al.

(10) Patent No.: US 7,087,179 B2
(45) Date of Patent: Aug. 8, 2006

(54) OPTICAL INTEGRATED CIRCUITS (ICS)

(75) Inventors: Cecilia Y. Mak, Santa Clara, CA (US);
John M. White, Hayward, CA (US);
Kam S. Law, Union City, CA (US);
Dan Maydan, Los Altos Hills, CA (US)

(73) Assignee: Applied Materials, Inc., Santa Clara, CA (US)

( * ) Notice: Subject to any disclaimer, the term of this patent is extended or adjusted under 35 U.S.C. 154(b) by 460 days.

(21) Appl. No.: 09/734,950

(22) Filed: Dec. 11, 2000

(65) Prior Publication Data

US 2005/0115921 A1 Jun. 2, 2005

(51) Int. Cl.
*B29D 11/00* (2006.01)

(52) U.S. Cl. .................. 216/24; 216/25; 216/39
(58) Field of Classification Search ........... 216/7, 216/24, 25, 39
See application file for complete search history.

(56) References Cited

U.S. PATENT DOCUMENTS

| | | | |
|---|---|---|---|
| 4,425,146 A | 1/1984 | Izawa et al. ............... 65/18.2 |
| 4,578,691 A | 3/1986 | Murakami et al. ............ 357/5 |
| 4,619,680 A | 10/1986 | Nourshargh et al. ........ 65/3.12 |
| 4,856,859 A | 8/1989 | Imoto ................... 350/96.12 |
| 4,972,799 A | 11/1990 | Misumi et al. ............. 118/723 |
| 5,125,946 A | 6/1992 | Bhagavatula ............... 65/106 |
| 5,165,004 A | 11/1992 | Okamoto et al. ........... 385/122 |
| 5,253,319 A | 10/1993 | Bhagavatula ............... 385/129 |
| 5,378,256 A | 1/1995 | Green et al. |
| 5,396,351 A | * 3/1995 | Gessel ....................... 349/159 |
| 5,408,569 A | * 4/1995 | Nishimoto ................. 385/132 |
| 5,567,476 A | 10/1996 | Law et al. ............... 427/255.7 |
| 5,689,614 A | 11/1997 | Gronet et al. .............. 392/416 |
| 5,858,051 A | 1/1999 | Komiyama et al. .......... 65/386 |
| 5,881,199 A | 3/1999 | Li ........................... 385/140 |
| 5,885,881 A | 3/1999 | Ojha |
| 5,904,491 A | 5/1999 | Ojha et al. ................ 438/31 |

(Continued)

FOREIGN PATENT DOCUMENTS

| | | |
|---|---|---|
| EP | 0 575 157 A1 | 12/1993 |
| EP | 0 803 589 A1 | 10/1997 |
| EP | 1 014 121 A2 | 6/2000 |
| JP | 06263452 | 9/1994 |
| JP | 11052159 | 2/1999 |
| WO | WO-A-0125829 | 4/2001 |

OTHER PUBLICATIONS

PCT Written Opinion for PCT/US01/47493, dated Mar. 12, 2004 (AMAT/5621.PC).

A. Kilian, et al. "Birefringence Free Planar Optical Waveguide Made by Flame Hydrolysis Deposition (FHD) Through Tailoring of the Overcladding", *J. Lightwave Tech.* vol. 18. No. 2 (Feb. 2000).

(Continued)

*Primary Examiner*—Lan Vinh
*Assistant Examiner*—Binh X. Tran
(74) *Attorney, Agent, or Firm*—Moser, Patterson & Sheridan LLP

(57) ABSTRACT

In one aspect, the invention provides methods and apparatus for forming optical devices on large area substrates. The large area substrates are preferably made of quartz, silica or fused silica. The large area substrates enable larger optical devices to be formed on a single die. In another aspect, the invention provides methods and apparatus for forming integrated optical devices on large area substrates, such as quartz, silica or fused silica substrates. In another aspect, the invention provides methods and apparatus for forming optical devices using damascene techniques on large area substrates or silicon substrates. In another aspect, methods for forming optical devices by bonding an upper cladding layer on a lower cladding and a core is provided.

25 Claims, 5 Drawing Sheets

U.S. PATENT DOCUMENTS

| | | | |
|---|---|---|---|
| 5,930,439 A | 7/1999 | Ojha et al. | 385/129 |
| 5,949,934 A | 9/1999 | Shima et al. | 118/723 E |
| 5,961,924 A | 10/1999 | Reichert et al. | 422/82.11 |
| 5,999,293 A | 12/1999 | Manning | 359/139 |
| 6,024,044 A | 2/2000 | Law et al. | 118/723 E |
| 6,151,430 A | 11/2000 | Traver, Jr. et al. | 385/14 |
| 6,222,971 B1 * | 4/2001 | Veligdan et al. | 385/120 |
| 6,282,358 B1 * | 8/2001 | Hornbeck et al. | 385/132 |
| 6,306,563 B1 * | 10/2001 | Xu et al. | 430/321 |
| 6,377,716 B1 * | 4/2002 | Veldhuis et al. | 385/1 |
| 6,500,603 B1 * | 12/2002 | Shioda | 430/321 |
| 6,553,164 B1 * | 4/2003 | Ono et al. | 385/45 |
| 6,724,968 B1 * | 4/2004 | Lackritz et al. | 385/131 |

OTHER PUBLICATIONS

Kashimura, et al., "Loss Reduction of $GeO_2$–Doped Silica Waveguide with High Refractive Index Difference By High–Temperature Annealing", 39 *Jpn. J. Appl. Phys.* vol. 39 No. 6A, Pt. 2 (Apr. 2000).

Tan, et al., "Fabrication of Gratings and Design of Diffractive Optical Elements Embossed on Sol–Gel Films"*SPIE Conf. on Design, Fabrication & Characterization of Photonic Devices* (Nov. 1999).

Sun, et al., "Building Passive Components with Silica Waveguides", *SPIE Conf. on Terahertz & Gigahertz Photonics*, pp. 313–319 (Jul. 1999).

Jung, et al., "Inductively Coupled Plasma Etching of Ge–Doped Boron–Phosphosilicate Glass for Planar Lightwave Circuit Devices", *J. Non–Crystalline Solids*, vol. 259, pp. 191–197 (1999).

U.S. Appl. No. 09/741,414, filed Dec. 19, 2000, Donahue.

Ruano, et al. "Fabrication of Integrated Microanalytical Chambers and Channels for Biological Assays Using Flame Hydrolysis Deposition Glass", *Microelectronic Eng., vol. 46* (1999), pp. 419–422.

Ruano, et al., "Lab–on–a–Chip Devices Fabricated Using Flame Hydrolysis Deposited Glass ", Inst. Of Elec. Eng. (1999), pp. 12/1–12/6.

Andrews. M., "An Overview of Sol Gel Guest–Host Materials Chemistry for Optical Devices", 2997 SPIE (1997), pp. 48–59.

Kobayashi, S., Recent Development on Silica Waveguide Technology for Integrated Optics, 2997 SPIE (1997), pp. 264–270.

Ding, et al., "Wavelet Structural Analysis of Silica Glasses Manufactured by Different Methods", *J. Non–Crystalline Sol.*, vol. 222 (1997), pp. 50–58.

Beguin, et al., "Planar Optical Devices for Use in Multi–Wavelength Systems", IEEE (1997), pp. 504–505.

Ojha, "Fabrication Technologies for Planar Waveguide WDM Components", 3211 SPIE (Dec. 1996), pp. 612–621.

Chun, et al. "Birefringence Reduction in a High Boron–Doped Silica–on–Silicon Planar Optical Waveguide", *J. Korean Phys. Soc.*, vol. 29, No. 1 (Feb. 1996), pp. 140–142.

Li, et al. "Silica–Based Optical Integrated Circuits", *IEE Proc. Optoelectron*, vol. 143, No. 5 (Oct. 1996), pp. 263–280.

Wu, et al., "Fabrication of High Concentration Rare–Earth–Doped Silica–Based Waveguide by MCVD Method", *IEEE Photonics Tech. Letters*, vol. 7, No. 6 (Jun. 1995), pp. 655–657.

Sun, et al., "Light Coupling from Diode Lasers to Microlensed Silica Waveguides", Conference on Optical Fiber Communication, vol. 8 (1995), pp. 228–229.

Sun, et al. "Silica Waveguide Circuits with Low Polarisation Dependence Fabricated on Silica Substrates", *Electronics Letters*, vol. 30 (Nov. 24, 1994), pp. 2032–2034.

Tsukahara, et al., "Evaluation of Layered Structures for Micromachines by Means of Ultrasonic Micro–Spectroscopy", *1994 Ultrasonics Symposium* (1994), pp. 1429–1432.

Sun, et al., "High Silica Waveguides on Alumina Substrates for Hybrid Optoelectronic Integration", *IEEE Photonics Tech. Letters*, vol. 4, No. 6 (Jun. 1992), pp. 630–632.

Sun, et al., "Silica–Based Circular Cross–Sectioned Channel Waveguides", *IEEE Photonics Tech. Letters*, vol. 3, No. 3 (Mar. 1991), pp. 238–240.

Ikunishi, et al., "A Study of Fabricating Silica Glass Waveguide by LP–CVD", (1987) pp. 66–69.

Sun, et al., "1×N Splitters on Silica Substrates with Low Polarization Dependent Loss", pp. 243–244.

Annex to Form PCT/ISA/206 for PCT/US01/47493, dated Sep. 17, 2002.

PCT Search Report dated Dec. 10, 2002 for PCT/US01/47493.

Communication pursuant to Article 96(2) EPC dated Oct. 6, 2004; Application No. 01 990 046.3.

* cited by examiner

OPTICAL INTEGRATED CIRCUITS (ICS)

BACKGROUND OF THE DISCLOSURE

1. Field of the Invention

The present invention relates to methods and apparatus for fabricating optical devices, such as optical integrated circuits (ICs).

2. Description of the Background Art

Communications systems utilizing optical components (e.g., splitters, routers, couplers, filters, etc.) are being used to address bandwidth issues in the communications industry. Such optical components may be fabricated as planar optical waveguide structures. FIG. 1 is a cross section of an exemplary waveguide structure 100. Planar optical waveguide structures are formed on a planar surface of a substrate 102 and typically comprise a core 104 surrounded by one or more cladding layers 106, 108. The core material has a higher index of refraction relative to the one or more layers of cladding material, to optically confine a light beam propagating within the optical waveguide. Currently, separate materials are being used to form each of the core 104, lower cladding 106, and the upper cladding 108.

Fabrication of planar optical components on silicon and silica substrates currently exists. These fabrication methods advantageously seek to use processing equipment traditionally used in integrated circuit (IC) fabrication. Currently, the size, shape and degree of integration of optical devices and integrated circuits on a common substrate are constrained by the size and shape of the substrate. Further, unlike IC designers who commonly utilize both vertical and horizontal structures in IC device design and fabrication, optical devices are generally constrained to pathways travelling in a single plane with stringent constraints on pathway curvature. As a result of these constraints, optical device layouts and fabrication methods favor die shapes having elongated rectangular dimensions.

For integrated optical device system fabrication, the number of devices that can be fabricated on a single substrate is limited by the size of the devices that can be formed on a circular substrate as well as device interconnections required for coupling them together. Because of the size limitation of the optical devices, often a circuit comprising multiple optical devices must be formed on one or more substrates, and be externally connected together by optical fibers in order to form the desired optical system. The use of external optical fibers to couple the optical devices increases optical losses and reliability of optical systems utilizing them, rendering less than satisfactory performance of the circuit.

A problem with silicon substrates, besides the circular shape, is it must be isolated from the waveguide to avoid interfering with the light wave traveling down the waveguide. Light waves traveling in a waveguide comprise two orthogonally polarized modes. For waveguide applications, one polarization is horizontal to the substrate and the other polarization is orthogonal to the substrate. If the lower cladding is too thin, the two orthogonal modes see a different effective refractive index resulting in birefringence, a consequential dispersion phenomenon that would limit the width of the transmission window. In order to minimize the effect of birefringence on optical devices formed on silicon substrates, a relatively thick, e.g., about 15 μm to about 30 μm, lower cladding is needed to serve as a buffer layer.

A conventional waveguide structure requires at least three deposition steps and one mask level. For example, the lower cladding layer must first be deposited to isolate the substrate from the waveguide. Next, a core layer is deposited and patterned to form the waveguide paths. An upper cladding layer is then deposited thereover. The upper cladding layer must be thick enough to prevent interference from external ambient light, i.e., light from the environment outside the device. In addition, each of these layers may, and currently do, require post deposition heat treatment to obtain the desired optical properties.

Another problem with silicon substrates in optical device fabrication results because the substrate and the material layers comprising the waveguide structure each have a different coefficient of thermal expansion (CTE). During fabrication, the substrate and the material layers of the waveguide structure are exposed to several heat cycles. These heat cycles as well as the different CTEs may cause the material layers of the waveguide structure to shrink more than the substrate, undesirably bowing the substrate. This also introduces stress in the films. This effect increases as larger and larger silicon substrates are used.

SUMMARY OF THE INVENTION

A method of forming an integrated optical device, comprising forming one or more optical waveguide components on a substrate having an area greater than about 400 cm$^2$.

A method of forming an optical device on a substrate, comprising depositing one or more of a lower cladding, a core and an upper cladding and heat treating one or more of the lower cladding, the core and the upper cladding in situ following deposition thereof.

A method for forming an optical device on a substrate, comprising forming a lower cladding on a substrate; depositing a core material on the lower cladding; patterning and etching the core material to form one or more optical devices; depositing an upper cladding on the lower cladding and the optical devices by depositing at least a portion of upper cladding and heat treating the deposited portion in situ.

A method of fabricating multiple optical devices on a substrate, comprising positioning a substrate in a first processing chamber, depositing a lower cladding on the glass panel; densifying the deposited lower cladding; positioning the glass panel in a second processing chamber, depositing a core layer on the lower cladding; patterning and etching the core layer to define a pattern of optical devices; positioning the glass panel in a third processing chamber, and depositing an upper cladding over the patterned optical devices.

A processing system for fabricating optical devices, comprising a transfer chamber having a robot disposed therein; one or more deposition chambers connected to the transfer chamber, the deposition chambers selected from the group of a USG chamber, a PSG chamber, and a BPSG chamber; and at least one densification chamber connected to the transfer chamber.

A method for forming a portion of an optical device on a flat panel, comprising positioning a flat panel in a first processing chamber on a processing system; depositing a lower cladding layer on the substrate; positioning the substrate in a densification chamber on the same processing system and treating the substrate therein; positioning the substrate in second deposition chamber to deposit a core layer on the lower cladding layer, and positioning the substrate in the densification chamber on the processing system and treating the substrate therein.

A method for forming a waveguide structure, comprising forming a light propagating channel in a lower cladding;

filling the light propagating channel with a core material to form a core; and forming an upper cladding over the core.

A method of forming waveguide structures, comprising depositing a lower cladding on a substrate; forming a light propagating channel in the lower cladding; depositing a core material in the light propagating channel; and bonding an upper cladding to the upper surface of the lower cladding and the core.

In one aspect, the invention generally provides method and apparatus for forming planar optical devices on substrates having sufficient optical properties to minimize birefringence or to serve as a part of the device.

In another aspect, a method of forming an optical device using a damascene process is provided.

In another aspect, a process of forming an optical device is provided in which an upper cladding is bonded to an upper surface of the lower cladding and the core.

In another aspect, a method of forming optical devices on large area substrates is provided.

In another aspect, a method of fabricating integrated optical devices is provided in which a quartz, silica or fused silica substrate is used as a board on which devices can be formed or otherwise mounted.

BRIEF DESCRIPTION OF THE DRAWINGS

The teachings of the present invention can be readily understood by considering the following detailed description in conjunction with the accompanying drawings, in which.

DETAILED DESCRIPTION

Figure 1:
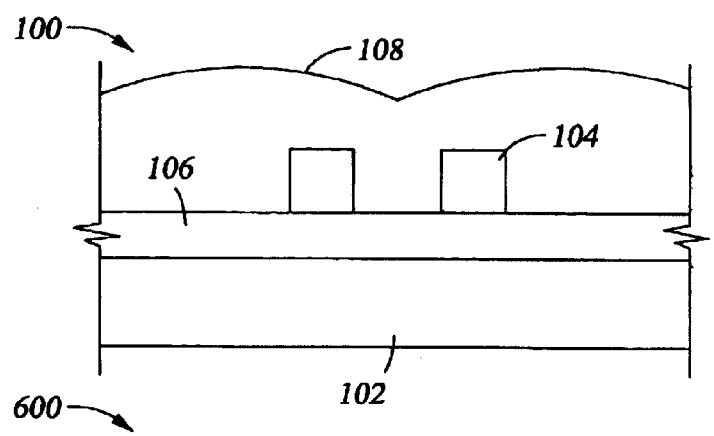
FIG. 1 is a cross section of an exemplary waveguide structure.

In one aspect, embodiments of the invention provide methods for fabricating optical devices on large area substrates made of materials such as quartz, silica, fused silica and the like. Using technology known in the flat panel display art, optical devices having superior performance to those formed on silicon are fabricated and can be integrated onto a large area substrate thereby enabling complex connections and circuit integration of devices. In another aspect, large area substrates are utilized to enable the fabrication of devices directly thereon as well as the assembly of other devices onto the substrate on which at least some devices have been fabricated. In another aspect, an integrated processing system and processes are provided which enable deposition of materials and densification of the deposited layers in situ, i.e., without exposing the layer to atmosphere. In another aspect, embodiments of the invention are directed to the fabrication of optical devices using damascene fabrication techniques. In still another aspect, embodiments are directed to lamination fabrication techniques used to form an upper cladding on an optical device.

Optical devices formed according to aspects of the invention are preferably formed on substrates of sufficient optical quality to function as a part of the device or to minimize the effects of birefringence. One property which is desirable in the substrate is a refractive index which makes the substrate suitable as a cladding material in an optical device. The substrates can also be made of a material having sufficient optical properties to enable the substrates to be used as a cladding layer without adversely impacting the efficient optical operation of the core material. Examples of substrates which are suitable for embodiments of the invention include, but are not limited to, glass silica and fused silica substrates.

Substrates that can be used to advantage include, but are not limited to, noncircular substrates having an area greater than about 400 cm$^2$. Exemplary substrates include, but are not limited to, rectangular or square substrates used in flat panel display fabrication having dimensions of, for example, about 370 mm × 470 mm or larger. Substrates having rectangular dimensions as large as 1 meter × 1.5 meter are currently being investigated for use in flat panel display fabrication and are suitable for optical device fabrication.

A. Large Area Substrates and Large Area Integration of Optical Devices

In one aspect, the invention provides embodiments which use large area substrates to enable the fabrication of large dimension optical processing devices, increased capacity optical processing devices as well as the integration of a plurality of optical processing functions into an optical processing device formed on a single substrate. In another aspect of the invention, the substrate material may also be selected so that the substrate may also form a portion of the device, such as for example, where the substrate acts as a cladding.

1. Large Area Substrate

The use of large area substrates enables the fabrication of single die optical processing structures having overall dimensions greater than the largest conventionally sized and shaped substrates available using current optical device fabrication techniques. Current fabrication of optical devices is limited by the available area of the substrates on which the devices are fabricated. Conventional fabrication techniques utilize circular substrates, e.g., silicon, having diameters of 100 mm, 125 mm or 150 mm. Because optical devices formed on substrates tend to utilize generally planar propagation pathways, designs seeking longer propagation pathways may impose designs that introduce bends to fit the design on the substrate real estate. The bends result in additional losses and the compromised design may also result in other negative operating constraints that adversely impact device performance. The fabrication of an optical processing device onto a large area substrate, for example a substrate used to fabricate a flat panel display, enables fabrication of components or devices which can include linear propagation pathways longer than can currently be fabricated on the smaller substrates. For example, a linear or nearly linear arrangement of optical processing components having a propagation pathway of about fifteen (15) inches in length can be formed on a large area substrate, such as a 400 mm × 500 mm (about 15.7 inches × 19.6 inches) flat panel. Some flat panels are larger than 1 square meter so even larger component arrangements may be realized. The ability to form a linear or nearly linear cascading arrangement of optical components for a particular optical device provides design freedom not found in conventionally sized and shaped substrates. In contrast, the same degree of component integration on a circular substrate typically requires a bending radius to be incorporated into the design in order to accommodate the desired components. The smaller area available on conventionally sized and shaped substrates also results in many optical components being fabricated elsewhere and then assembled on the substrate. The integration of these externally formed components requires that additional optical pathways be provided between the additional components to realize the desired design. Typically, fiber optic cables function as optical connectors between components to achieve the desired design. However, both bending radius and optical connectors as used with conventionally sized and shaped substrates introduce propagation losses in the optical signal being processed. As a result, such alterations to the signal processing design may cause the signal to be attenuated below a useful level, resulting in a need for amplification.

Accordingly, in one embodiment of the invention, optical devices are formed on large area substrates having an area greater than about 400 $cm^2$. Using large area substrates and equipment designed to efficiently process such substrates enables devices to be designed with lower loss propagation pathways (i.e., propagation pathways that need not resort to bending designs or external optical connectors.)

Another advantage of using large area substrates in the fabrication of optical devices is increased utilization of substrate real estate. In commercial production, non-circular large area substrates can be used to produce a larger number of conventional optical devices on a single substrate with increased percent utilization of the substrate.

Additionally, the use of square or rectangular substrates provides a common form factor between the substrate and the die on which devices are formed resulting in more efficient utilization of the substrate. Table 1 shows that this utilization is preferably greater than about 75% and can be as high as 100%.

While examples are provided herein comparing rectangular and circular substrates, each having rectangular die formed thereon, aspects of the invention contemplate all large area non-circular substrates. Generally, aspects of the invention contemplate substrates capable of having die formed thereon having an overall area of at least about 400 $cm^2$. Table 1 shows a comparison of the number of devices, illustratively 4 mm × 100 mm or 2 mm × 50 mm devices, and the area utilization that can be achieved on a 300 mm circular substrate and a 400 mm × 500 mm substrate.

TABLE 1

| Device Size | 4 mm × 100 mm | | 2 mm × 50 mm | |
| --- | --- | --- | --- | --- |
| Substrate Size | 300 mm | 400 × 500 | 300 mm | 400 × 500 |
| No. of Devices | 110 | 500 | 564 | 2000 |
| Area Utilization | 62% | 100% | 80% | 100% |

Additionally, a 620 mm × 750 mm substrate yields 4650 2 mm × 50 mm devices with 100% utilization of the substrate and 1122 4 mm × 100 mm devices with 96% utilization. The similar form factor of the die and the substrate in addition to the large area provides efficient commercial utilization of the substrate with a high yield in die.

Additionally, larger die lengths can be manufactured using the larger area substrates. For example, conventional 400 mm × 500 mm substrates can be used to make a plurality of die having a length of 20 cm. Using a 200 mm circular substrate, the die length is limited to less than 20 cm and only one die having a length of about 20 cm can be fabricated on each substrate due to the constraints on substrate real estate. However, using non-circular substrates having an area larger than 400 $cm^2$ enables the fabrication of multiple devices having a length of for example 20 cm or longer. Additionally, as substrate sizes increase, for example to one (1) square meter, more devices having longer lengths can be fabricated. Die sizes which can be fabricated on a single substrate include a plurality, e.g., more than one, die having a length of at least about 6 inches up to about 1.5 meters.

In one embodiment, a large area substrate is advantageously employed to fabricate an optical component or device die having a major dimension and a minor dimension where the major dimension of the optical component or device die is longer than about 15 cm. In another embodiment, the major dimension of an optical component or die is nearly as long as the major dimension of the large area substrate used to form the device. In still another embodiment, the major dimension of a single optical device or component die is from about 15 cm to about 1.5 meters.

2. Large Area Integration i. Signal Processing Integration

As optical devices gain increased usage in communications and other systems, integration of devices to form more sophisticated devices is anticipated. Embodiments of the present invention provide for multiple optical signal processing components formed onto a single substrate wherein a seamless propagation path or core joins the various optical processing components. Large area integration enables optical signal processing component integration whereby multiple components may be fabricated onto a single integrated optical signal processing device die to accomplish the desired signal processing steps. In this context, integrated optical signal processing device refers to the use of a seamless propagation path or core to couple together the individual optical components. Thus, the use of large area substrates also enables integration of multiple optical signal processing components onto a single substrate without utilizing external fiber optic connections between the various planar optical processing components.

Figure 2:
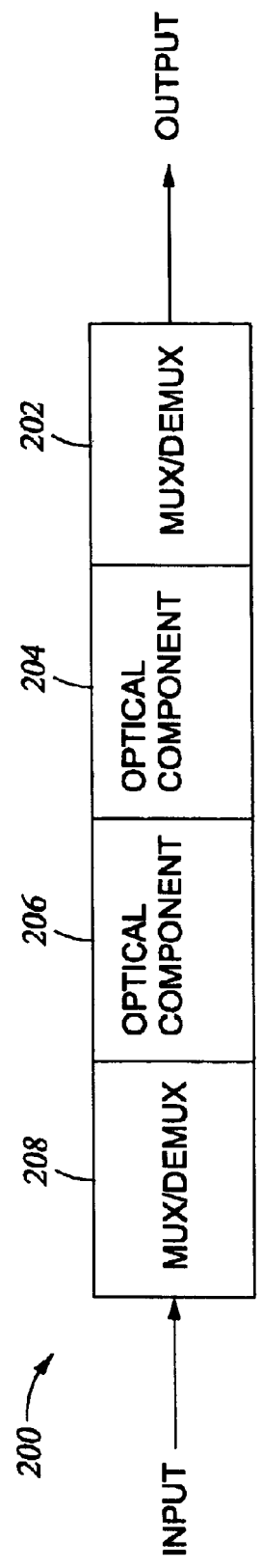
FIG. 2 is a schematic of an integrated optical device.

Large area integration of optical processing components enables optical component designers to arrange a plurality of optical processing components to produce a desired resulting optical signal. In one example, an integrated optical device may be formed in accordance with the present invention by fabricating several passive optical processing components integrally formed together and joined by a seamless propagation pathway. FIG. 2 illustrates one example of an optical device 200 which may include components such as a multiplexer or de-multiplexer 202, an add/drop filter 204, a switch 206 and a multiplexer or de-multiplexer 208, all of which could be fabricated on a single die and utilizing a seamless core to propagate the optical signal between the various components of the device. The above example is for purposes of illustration and not limitation and represents only an exemplary integrated optical component optical signal processing device. Various optical components such as, for example, couplers, splitters, filters, array waveguide gratings, Bragg gratings, taps, attenuators, multiplexers, de-multiplexers, can be integrated onto a single substrate and connected together to form an integrated optical circuit to achieve desired signal processing. The large area integration aspect of the present invention enables the fabrication of a wide variety of integrated component optical processing devices. Those of ordinary skill in the art will appreciate that embodiments of the invention enable a wide variety of integrated component optical processing devices to be designed and fabricated. It is to be appreciated that the individual optical components are integrated together by a seamless core through which the operation of the integrated component optical device is achieved.

Conventional fabrication techniques require separate components to be fabricated and connected to one another using external connections to form the overall device. The use of external connections introduce propagation losses into the device. The use of a seamless core between components eliminates or substantially minimizes the losses associated with the use of external optical fiber connections between individual optical components. These losses can include propagation and insertion losses associated with any gaps present in a connection between an optical fiber connector and an optical component, misalignments in the optical fiber connector introduced by changes in the optical component structures being connected or by changes in the materials making up the connector itself. Device integration has the benefit of increased reliability resulting from the elimination of external fiber connections. Also, the typical insertion losses resulting from coupling round fiber connectors to generally square core structures is eliminated, at least in the integrated device which is formed.

Figure 3:
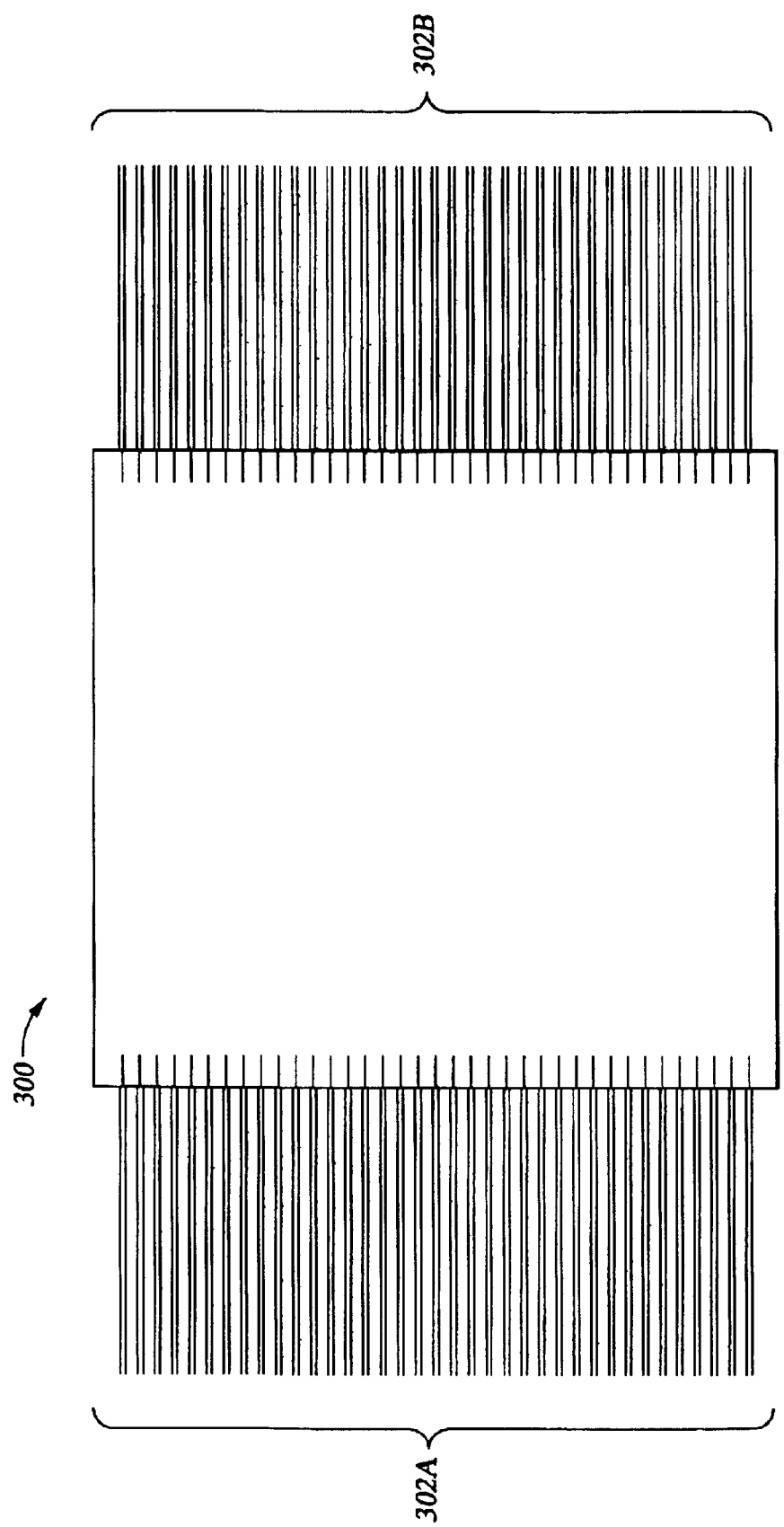
FIG. 3 is a schematic of a large area device having a plurality of input/output connections.

In another aspect of the invention, large area integration is used to facilitate the connection of an increased number of input/output optical fibers directly onto an optical device. FIG. 3 illustrates an optical component 300 having a large number of I/O connections 302A–302B. Generally speaking, increased substrate area enables increased I/O capacity of optical processing devices formed on such a substrate. In general, optical fibers have a circular core approximately 8 microns in diameter that is surrounded by a cladding such that the overall diameter of the structure is about 125 microns. As the number of optical fibers connected to the device increases, more area is needed to accommodate the overall core cladding structure of each optical fiber input/output connection.

This large area integration advantage provides larger dimensions to accommodate more input/output optical fibers. As device usage increases and the need for bandwidth increases, the integration of larger devices formed on larger substrates having an increased number of inputs and/or outputs can be fabricated. Because most devices are currently connected at some point to an external optical fiber utilized to transport light over long distances or between devices, additional area is needed to provide connections between the fibers and the optical device. As one example, a cross connect (interconnect) can advantageously be fabricated which has an increased number of connections and cores to accommodate an increase in the required capacity of the device. In the example of cross connects, the use of a large area substrate enables the design of larger cross connect die which can accommodate more input and output connections for optical cables. In addition, the use of quartz, silica or fused silica substrates provides an advantage of fusion bonding between the optical fibers and the optical components. Optical processing devices formed using conventionally sized and shaped substrates are limited in the size of the devices that can be fabricated and the ability of those size devices to accommodate an increasing number of fiber optic cables. Thus, the ability to connect multiple optical fibers to a device requires sufficient substrate real estate to accommodate the physical connection to the optical component. The ability to physically accommodate additional fiber optic connections enables a wider range of optical signal processing.

Figure 4:
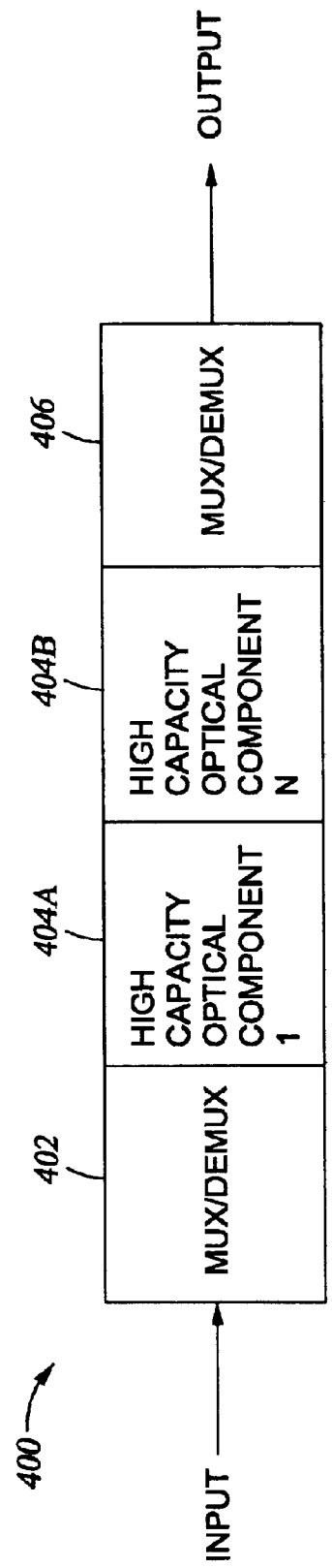
FIG. 4 is a schematic of a high capacity integrated optical device.

In another aspect of the invention, large area integration enables designers of optical signal processing devices to design and employ high capacity optical signal processing components. As the multiplexing capability of optical signals onto a single optical fiber increases and the number of individual fiber optic cables that can be coupled to an optical device increases, the number of individual optical signals to be processed also increases. Thus, there is a need for designers to have the freedom to design individual optical processing components having an increased optical signal processing capacity. Some designs would benefit from a large area in which to design propagation pathways that would enable a plurality of individual optical signals to be processed in parallel. FIG. 4 illustrates an integrated optical device 400 having multiple optical components which can process an increased number of optical signals introduced into the device. The representative device shown in FIG. 4 includes inputs on the left and outputs on the right and optical processing devices 404A–404B representing the "high signal processing capacity". For example, a filter having the capability to process the influx of signals from (a) an increased number of optical fibers connected to the device andlor (b) one or more optical fibers each carrying highly multiplexed optical signals. The signals are input and demultiplexed, for example, for further processing by the high capacity processing components formed on the substrate. The processing components require additional area to accommodate the additional propagation pathways to achieve the desired processing capacity.

ii. Assembly Integration of Devices Onto A Large Area Substrate

In another aspect of the invention, a large area substrate is used as a common carrier on which devices can be directly formed and on which other optical devices can be mounted. The devices are then connected to one another using conventional techniques utilizing optical fiber connections or pigtails. Optical components can be formed on a large area substrate, referred to herein as an optical signal processing panel, and other components mounted or affixed to the large area substrate. An optical processing panel as described herein refers to an assembly process for fabricating integrated optical processing components to form optical processing devices. In one embodiment, an optical processing panel according to aspects of the invention comprises a plurality of passive optical processing components formed or fabricated on the optical processing panel. In one aspect, some or all of the cladding or core of these passive optical processing components are formed using the processing systems and methods described herein. For example, an optical processing panel can include a substrate with sufficient optical quality and characteristics to form a part of the cladding with a plurality of optical processing components formed thereon. In another aspect of the invention, some or all of the plurality of optical processing components are formed using a damascene processing technique such as that described in greater detail below. In yet another aspect, a cluster tool processing technique described below may be used to fabricate all or part of the plurality of optical processing components formed on the optical processing panel. It is to be appreciated that other embodiments of the invention may utilize any combinations of the various aspects of the invention presented herein. For example, an optical processing panel may comprise a plurality of passive optical processing components formed using the substrate as a cladding material, forming a seamless core using a damascene process where deposition and/or densification of the core or other deposited cladding material is performed in situ in a cluster processing system.

In an alternative embodiment of an optical processing panel, some passive optical processing components are formed on the optical processing panel as described above and other components are fabricated elsewhere are then bonded, joined, laminated or otherwise suitably affixed to the optical processing panel. The components fabricated elsewhere can include passive optical processing components, active optical processing components, or electronic components. It is also to be appreciated that IC on glass techniques may also be used to integrate the operation of an electronic integrated circuit into the operation of the optical processing device.

One method of forming an integrated optical device comprises forming one or more passive optical devices on a substrate having an area greater than about 400 cm$^2$. Preferably, the substrates are square or rectangular in shape to conform to the common shape of the die having the optical devices formed thereon. Additionally, one or more active and/or passive devices can be assembled onto the substrate on which the passive devices have been formed to from an integrated optical device. Examples of the passive devices which can be formed on the substrate include, but are not limited to, waveguides, splitters, filters, couplers, cross connects, multiplexers, de-multiplexers and combinations thereof.

While the description above details individual optical devices, the methods and apparatus of the present invention may be advantageously utilized to fabricate an optical device that integrates several optical components into a single integrated structure formed on a single substrate. Such an integrated optical device would not require as many interconnection steps as required when several individual devices are fabricated individually and then joined together to form a device or connected together to perform a specified optical processing function.

iii. Electrical and Optical Component Integration

Another area of integration includes fabricating both optical devices and electronic devices on the same substrate. In one embodiment, an optical processing panel is employed to form an optical processing device that utilizes both optical signal processing components and electronic signal processing components in an integrated optical processing device. The electronic signal processing components may be formed elsewhere and then affixed to the optical processing panel as described above using for example, IC on glass techniques. However, the methods and apparatus of embodiments of the invention may be employed to fabricate an optical processing panel having both optical processing components and electronic processing components integrally formed onto the optical processing panel. In one embodiment, an optical processing panel is patterned to form the optical components and the area set aside for the electronic processing components is masked. After the optical processing component and device fabrication is completed, those areas are masked and the area set aside for the electronic processing components is unmasked and the electronic processing components are formed thereon. It is to be appreciated that the order of fabricating either the optical processing components or the electronic processing components at first maybe reversed. It is also to be appreciated that embodiments of the present invention may be used to fabricate both electronic and optical processing components simultaneously using embodiments and methods of the cluster tool or process sequences described herein.

B. Integrated Processing System

An integrated processing system according to embodiments of the invention refers to deposition process selection to enable the deposition of a particular material as well as process sequence selection to enable the ordered deposition of a particular structure. Examples of deposition process selection includes, but is not limited to, processes for the deposition of cladding or core materials used to form an optical component. Process selection also includes processes used to deposit other materials useful in the fabrication of optical signal processing components. For example, an encapsulation material may be deposited over a layer of an optical processing component for the prevention of moisture absorption, particulate damage or other degradation of the layer(s) or material(s) disposed thereunder. In a particular example, an encapsulation layer may be deposited over a deposited and densified BPSG cladding layer to prevent moisture from being absorbed into the BPSG film. Process selection may also include the deposition of other materials, such as, for example, a hardmask material deposited over a cladding layer or the core which is used in a later lithography and patterning processing step. Processing chambers selected to enable these and other types of process selection to enable a variety of material deposition include, but are not limited to, chamber capable of depositing undoped silica glass (USG); doped silica glass such as, for example, boron and phosphorus doped silica glass (BPSG) or phosphorus doped silica glass (PSG); amorphous silicon, polysilicon, silicon nitride ($Si_3N_4$), silicon oxynitride (SiON), germanium oxide ($GeO_2$), other doped materials, such as rare earth (Lanthanide series material, such as erbium, praseodymium, etc.) doped materials and the like.

Integrated processing system also refers to the advantageous arrangement of particular processing chamber on a cluster tool to enable not only high throughput optical component and device fabrication but also specialized integration of processing sequences to address specific challenges of optical device and component fabrication.

Figure 5:
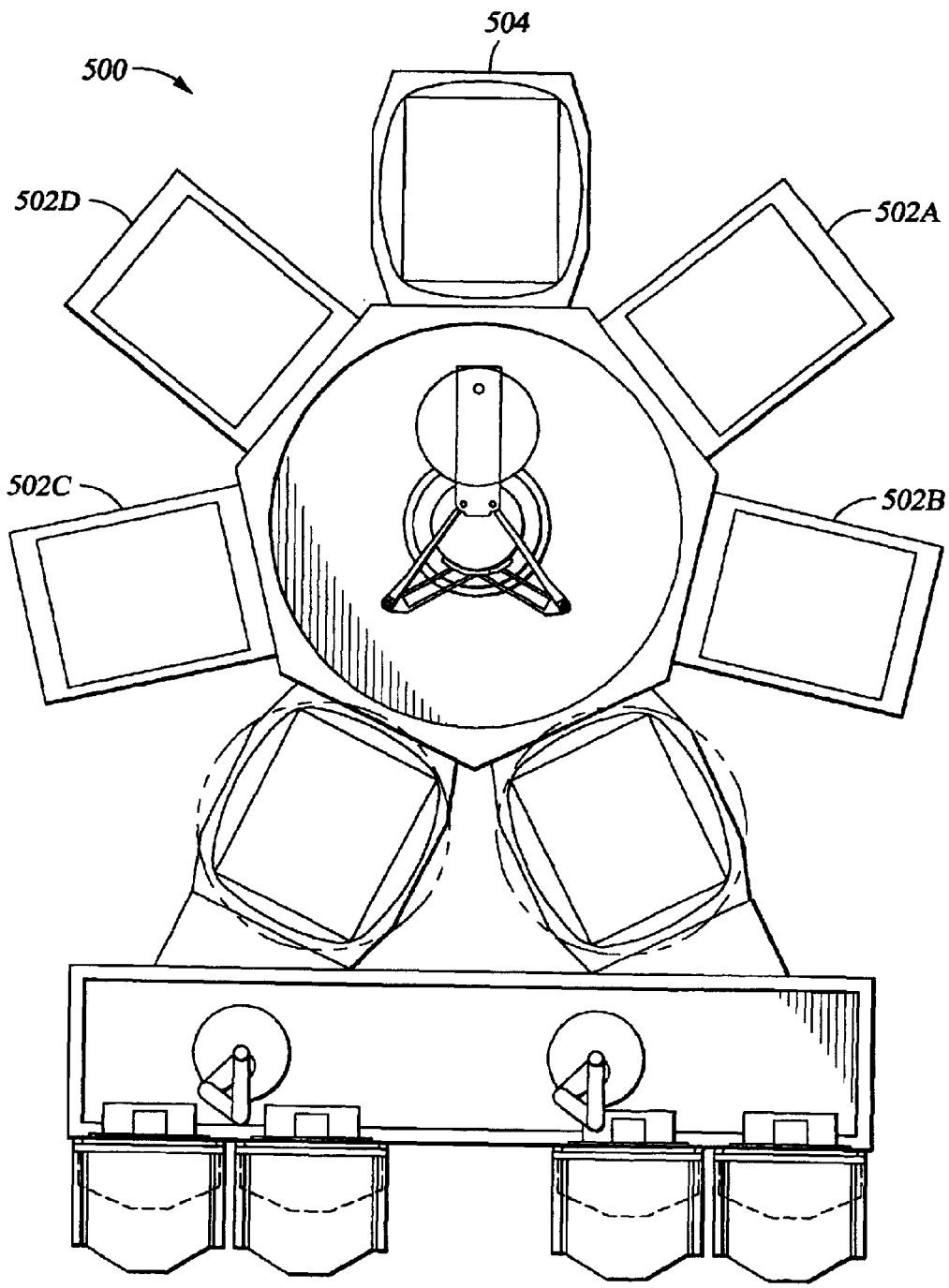
FIG. 5 is a schematic plan view of an exemplary processing system that can be used for the practice of embodiments described herein.

Processing systems capable of providing both process sequence selection and cluster tool processing chamber capabilities for optical component and optical device fabrication are available from AKT, Inc, located in Santa Clara, Calif. One such system is the AKT 1600 processing system which is schematically shown in FIG. 5. The processing system 500 can be configured to include one or more processing chambers 502A–502C such as, but not limited to, a USG chamber, a PSG chamber and/or a BPSG chamber, a physical vapor deposition (PVD) chamber, and at least one post deposition treatment chamber 504, such as a thermal anneal chamber. Other processing chambers may be included, or the above chambers may be utilized for the deposition of encapsulation materials as well as masking materials. Other deposition systems and processes such as spin-on coating, silk screening, capillary coating, spray-on coating, sol gel coating as well as deposition and formation of organic (polymeric coatings) and inorganic materials are contemplated for forming one or more materials in the optical devices as described and referred to herein.

The post treatment chamber 504 is useful for performing, when needed, densification, consolidation and stress relief processing of deposited films used in the fabrication optical processing components and devices. Appropriate heat treatment processes in the context of optical signal component and device fabrication includes, but is not necessarily limited to, densification, consolidation and stress relief of a material. An exemplary processing chamber is an AKT 1600 PECVD Chamber and an exemplary thermal anneal chamber is a rapid thermal anneal chamber, such as a lamp heated thermal anneal chamber available from Applied Materials, Inc. located in Santa Clara, Calif. Other chambers and process can include physical vapor deposition (PVD) chambers and processes. Additional systems such as lithography and etching systems are also utilized to form desired structures through conventional patterning and etching processes.

One advantage of a cluster tool system, such as the AKT system described above, having a post deposition treatment chamber disposed thereon is that films deposited in the system can be densified, consolidated or otherwise heat treated in situ (i.e., without the use of an external heat treatment apparatus such as a furnace) thereby eliminating the risks associated with exposing deposited, non-heat treated films to atmosphere. Additionally, the number of chambers and sequence of operating those chambers may be advantageously selected to provide for multiple deposition and densification processes to be performed sequentially without exposing the substrate to atmosphere. In one embodiment, a rapid thermal anneal chamber can be used to rapidly anneal and densify films deposited in the processing system. Processing systems can be configured to perform the process sequences described below and others useful in the fabrication of optical processing components and devices.

In one process sequence utilizing an integrated processing system, an cladding layer and then a core layer can be deposited in a single process chamber. The processing system is configured to include at least one chamber which can deposit materials suited for use as cladding and core layers. For example, a cladding layer may be formed by depositing a layer of USG and a core layer may be formed by depositing a layer of PSG. The substrate can then be moved to another system in which appropriate patterning and etching can be performed. Following patterning and formation of the core light propagating channels, the substrate can be returned to the same deposition processing system or to a different processing system where an upper cladding, such as BPSG, can be deposited over the patterned core structures. Following deposition of the upper cladding, the substrate can be moved in situ to a rapid thermal anneal chamber, or other thermal anneal chamber, so that an appropriate heat treatment process may be performed on the upper cladding layer. It is to be appreciated that while the process described above describes the use of a heat treatment chamber after the disposition of the entire multi-layer stack, the process sequence for the formation of a single layer in a multi-layer stack may include sequential processes performed in a deposition chamber and a heat treatment chamber.

In another process performed in an integrated processing system, a lower cladding, such as USG, is deposited in a first chamber, a core, such as PSG, is deposited over the under cladding in the same chamber or a different chamber, and then a hard mask, such as poly silicon or amorphous silicon, is deposited over the core in another chamber. The processing system is configured with chambers capable of depositing the under cladding, the core, and the hard mask so that the substrate can be processed in a single system before being moved to a patterning and etching system. These films can be deposited in the same chamber or in separate chambers. In embodiments where the films are deposited in a single chamber, the processing system can be configured with three chambers capable of depositing each of the films.

In another process performed in an integrated processing system, a single material is deposited sequentially in a plurality of chambers. The system can be configured with more than one chamber designed to deposit the same film so that the substrate can be sequentially moved through the chambers to deposit the desired film thickness. This may be advantageous where a film thickness is required which may lead to particle generation if the entire film is deposited in a single chamber. As an example, a chamber is typically cleaned after a select amount of material is deposited therein. If the amount of deposition required to form a single layer exceeds an amount which can safely be deposited in the chamber without particle issues, then a sequential deposition step may be utilized.

In another process performed in an integrated processing system, multiple step deposition processes can be carried out wherein a portion of the film is deposited and then annealed prior to continued deposition to provide a complete film. As one example, a system can be configured with one or more processing chambers configured to deposit a lower cladding, a core, an upper cladding or a combination of any of the above and a post treatment chamber to densify the film. This deposition/densification cycle may be necessary in applications where the total film thickness exceeds that which can be efficiently and adequately densified.

In another process performed in an integrated processing system, each of the films, e.g., the lower cladding, the core and the upper cladding, can be deposited in a separate chamber and a post treatment chamber can also be provided to enable treatment of the film without breaking vacuum.

The processing chamber used to deposit the films can include CVD capable of depositing CVD films over a wide range of process conditions. The processing chambers can be employed to deposit a variety of CVD films including low temperature process films and high temperature process films. Some specific applications include TEOS (tetraethylorthosilicate) or silane based PECVD and SACVD (subatmospheric CVD) chemistries, including the deposition of undoped silicon oxide (USG) and doped silicon oxides such as boron phosphorus silicate glass (BPSG), phosphorus silicate glass (PSG) and fluorine-doped silicate glass (FSG). Similarly, silicon nitride ($Si_3N_4$), silicon carbide, $SiO_xN_y$, amorphous silicon and other layers can be deposited using the apparatus of the present invention. The CVD chambers can include mixed frequency chambers which are capable of controlling film composition, including dopant incorporation into the film. Additionally, an erbium doped core structures could also be fabricated.

Other processes which can be used to deposit materials used in the fabrication of optical devices include physical vapor deposition (PVD) performed in PVD chambers. The chambers are adapted to deposit materials on large area substrates using sputtering techniques.

Thermal anneal chambers are used to densify or homogenize the deposited layers. Homogenization and densification can be used to enhance the optical qualities of the deposited layers. It is believed that the thermal annealing process removes any dangling constituents in the layer that may result in less than desirable optical performance of the devices. Additionally, thermal treatment of the layer affects the lattice structure of the film in a manner to enhance the optical properties of the layer. Thermal anneal can also provide flow in a gap fill process where a material such as BPSG is flowed between adjacent core light propagating channels. Additionally, thermal anneal processes provide stress relief to the deposited films.

The integrated processing system and the material deposition process sequences described above may be advantageously utilized to fabricate optical processing components and devices having a difference in refractive index ($\Delta$ n) of about 0.6% between the cladding materials and the core. It is to be appreciated that embodiments of the present invention may also be advantageously employed to deposit materials and fabricate structures that enable the fabrication of optical processing components and devices having a $\Delta$n of greater than about 0.6%.

C. Embodiments of Damascene Process Sequences

Figure 6:
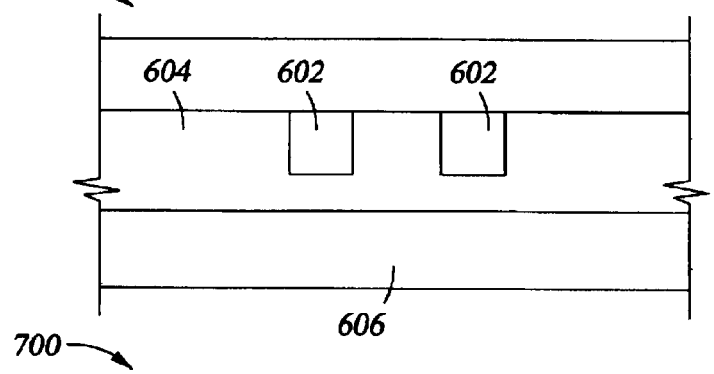
FIGS. 6–8 are cross sectional views of various devices formed on or in a substrate according to embodiments of the invention.
Figure 7:
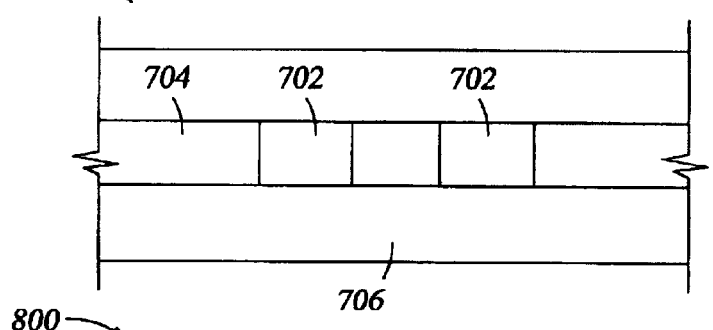

FIGS. 6 and 7 are cross sectional views of optical signal processing devices 600 and 700, respectively, formed using damascene type fabrication processes. In damascene technology, the features or structures of a device are etched into an underlying layer and then filled with the material out of which the structure or feature is to be formed. This is in contrast to conventional techniques which include deposition of bulk material followed by patterning and etching of the deposited material to form the structures. In damascene type fabrication processes as applied to optical signal component fabrication, a core or optical signal propagation pathway 602, 702 is patterned into a cladding material 604, 704, which may be the substrate in some embodiments. Next, a suitable core material, selected for its optical transmission properties, is deposited into the patterned optical signal propagation pathway. The core film may be a doped film such as PSG in a $\Delta$n ~0.6% optical device or an undoped film in an optical device having a $\Delta$n greater than about 0.6%. In one particular embodiment for a $\Delta$n ~0.6% optical device, the core is preferably formed from a doped material, such as PSG.

Damascene type fabrication processes may be employed to pattern an optical propagation pathway into a variety of cladding materials. In the embodiment shown in FIG. 6, a damascene process may be used to pattern a lower cladding layer 604 that is deposited over a substrate 606. The lower cladding 604 can be thicker than the core height to provide an under layer below the core 602 (as shown in FIG. 6). This approach may be appropriate when a somewhat thicker cladding layer is desired to prevent the substrate from interfering with the optical propagation properties of the core. For example, if the substrate were formed from silicon the lower cladding layer 604 may be several microns thick or as much as 10 microns thick to isolate the waveguide from the silicon.

Alternatively, in the case where the substrate has sufficient optical qualities to act as a cladding layer, the substrate can serve as the lower cladding so that the core 702 can be directly deposited on the substrate (as shown in FIG. 7). Alternatively, a much thinner lower cladding can be used. The substrate in this case acts as the lower cladding below the core while the deposited and patterned lower cladding 704 defines the sidewalls of the core and can be referred to in these applications as the sidewall cladding.

In another alternative embodiment where the substrate has sufficient optical quality to act as a cladding, the core or optical propagation pathway may be patterned directly into the substrate. In this embodiment, the substrate acts a cladding layer having contact with the subsequently deposited core on more than one side.

During damascene processing operations, the cladding material is patterned and etched to define the core or optical propagation pathways within the cladding material. Conventional techniques such as dry etching and related lithography processes compatible with the materials used to form optical signal processing devices may be used. After patterning, the core material is then deposited into the patterned features. The upper surfaces of the cladding layer and the core layer are then planarized to define a generally planar upper surface on which an upper cladding layer can be deposited. Planarization may be accomplished using etching, chemical mechanical polishing, or other techniques known in the art. The upper cladding layer can be a deposited layer or a bonded layer, e.g., a sheet of material, such as a substrate, positioned on the upper surface of the lower cladding and the upper surface of the core layers (as described in detail below).

In some embodiments of the invention, the optical signal processing devices formed comprise a lower cladding having a thickness of between about 10–15μm, a core layer having the dimensions of either about 6×6 μm or about 8×8 μm, and an upper cladding having a thickness of about 10–18 μm. Smaller device structures can also be formed using the processes described herein. The processes described herein have the capability of forming device structures, e.g., core structures, in the 0.35 μm and smaller range.

Figure 8:
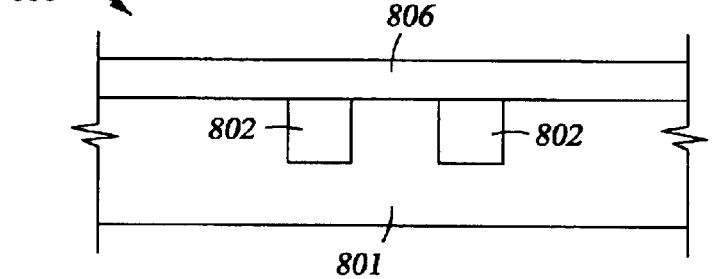

FIG. 8 illustrates another embodiment of a substrate 800 which is patterned and etched to define the core pattern 802 within the substrate itself. Once the pattern has been formed within the substrate, the core material is deposited within the core pattern. The upper surface of the substrate is then planarized, using techniques such as etching (e.g., etchback), CMP, and the like, to planarize the upper surface of the deposited core channels within the substrate. An upper cladding is then deposited on the upper surface of the substrate and the core. Alternatively, an upper cladding 806 may be bonded to the upper surface of the substrate and the core. The upper cladding may be a deposited layer such as BPSG or other material having a refractive index different than the refractive index of the core material. One advantage of forming the core in the substrate and then utilizing another similar substrate as an upper cladding layer is that the core is surrounded by the same material on all sides. When a core is surrounded by similar material on all sides the optical signal propagation characteristics of such a core are improved over those of a core surrounded by different materials.

Figure 9:
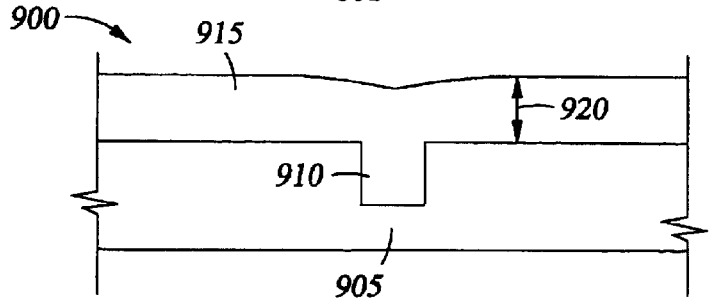
FIG. 9 is cross section of an alternative core structure of an optical device.

The damascene process described above is not limited to forming a particular core structure such as the buried core structures illustrated in FIGS. 6, 7 and 8. It is to be appreciated that embodiments of the damascene method described above may also be advantageously employed to form other core structures such as, for example, a ribbed core structure. FIG. 9 illustrates a representative ribbed core structure 900. Ribbed core structure 900 is formed by patterning substrate 905 with the optical signal propagation channel 910 that is suitably sized and shaped for ribbed core structures.

Once substrate 905 is patterned, optical signal propagation channel 910 is filled with a suitable core material 915. The suitable core material 915 is provided to a thickness 920 above the substrate. Core material thickness 920 is selected depending upon the optical properties of core material 915, the operating environment of the ribbed core structure 900 and other factors. In one embodiment of a ribbed core structure 900, core material 915 is a material having a high refractive index and the core thickness 920 is sufficiently thick that the ribbed core structure 900 of this embodiment may function with the air as an upper cladding (i.e., a separate upper cladding material is not deposited, bonded, formed or otherwise provided over core layer 915). In an alternative embodiment of the ribbed core structure 900, core layer 915 is formed as described above and, in addition, a cladding layer is deposited over core layer 915.

It is to be appreciated that the fabrication of the core stucture 915 may be accomplished by any of the techniques described herein. For example, core 915 could be deposited by CVD or PVD deposition techniques or other layer fabrication techniques described above. Additionally, in situ densification of the deposited core and/or upper cladding may also be employed.

The damascene embodiments described herein are not limited to the large area substrates or to the glass panel type substrates. Conventionally sized and shaped substrates used in the fabrication of optical signal devices may also enjoy the advantages of the damascene fabrication techniques described above and suited to the fabrication of optical signal processing devices.

D. Embodiments of Lamination Process Sequences

Another aspect of the invention provides for the formation of an optical device by bonding an upper cladding on the device following fabrication of a core into or on a lower cladding. This approach to the formation of optical devices eliminates a deposition process and replaces the deposition of an upper cladding with an assembly process. It is believed that substrates such as quartz, silica and fused silica, can be used to form the upper cladding which is bonded on the upper surface of the core and the lower cladding. For example, the upper cladding can be assembled on structures formed according to damascene sequences as described above.

In applications where the upper cladding is a bonded piece of material, such as another substrate, the upper cladding is bonded, fused or otherwise adhered to the substrate and the core material. In one embodiment, the upper cladding can be a second substrate comprised of a similar material as the underlying substrate. In a particular process sequence where a damascene method is employed to form a core into a substrate, the only deposition step required is one to form the core material. As a result, deposition of an upper cladding material such as for example, BPSG is eliminated. Along with the elimination of the BPSG deposition step is the elimination of any flow or reflow processes required following deposition of the BPSG. The result is a fabrication process which has fewer steps that may be translated into an increased throughput process sequence.

As one example, a method of forming an optical device includes depositing a lower cladding on a substrate; forming a light propagating channel in the lower cladding; depositing a core material in the light propagating channel; and bonding an upper cladding to the upper surface of the lower cladding and the core. The lower cladding can be made of a material selected from the group of USG, undoped silica, or other undoped material having desirable optical properties. The upper cladding is bonded to the upper surface of the lower cladding and the upper surface of the core using an adhesive having a refractive index compatible for use with the upper cladding or the lower cladding. One example of an adhesive is an epoxy.

An alternative method of bonding an upper cladding material to the core and cladding structure is the method of applying a bulk material and then curing that material to leave behind a cladding layer. The use of a liquid/curing technique to form the upper cladding layer is particularly useful when the planarity of the upper core and cladding surfaces may be less than desired such that the lamination of a single panel cladding as described above may be impractical. One example to overcome the difficulty introduced by non-planar upper core and cladding surfaces may be applying a cladding material mixture comprising an inorganic material suspended in a volatile material. After applying the cladding material mixture to the core cladding structure, the volatile material is driven off leaving the inorganic material in place over the core and cladding structure. The inorganic material is selected to have a refractive index of suitable magnitude to function as a cladding material. It is to be appreciated that an inorganic or organic material may be suspended in the volatile material for later use as a cladding material.

Figure 10:
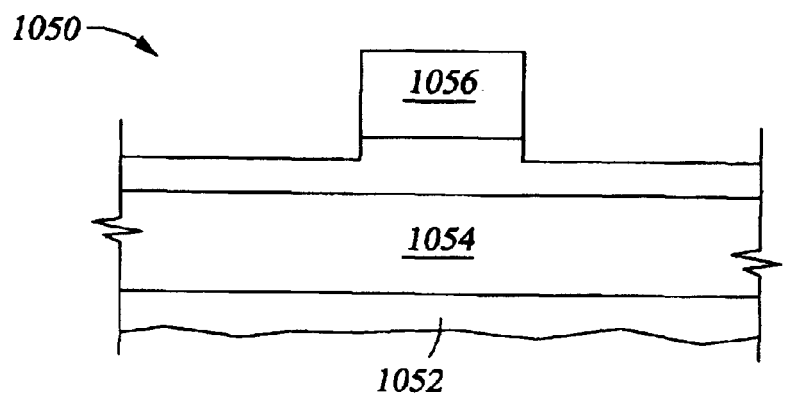
FIG. 10 is a cross section of an alternative core structure of an optical device.

While embodiments have been described herein with reference rectangular and square cross section core structures, such as the buried core structure illustrated in FIG. 6, for example, core structures having other shapes and processes for forming these core structures is also contemplated herein. FIG. 10 represents a core structure 1050 having an under cladding 1054 formed on a substrate 1052. Subsequent patterning processes are used to shape the cross section of core 1056. A cladding layer is then formed over the resulting core structure 1056.

Figure 11:
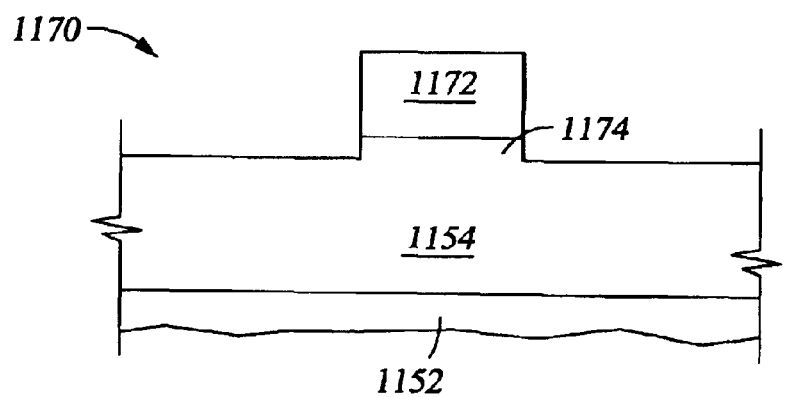
FIG. 11 is a cross section of an alternative core structure of an optical device.
Figure 12:
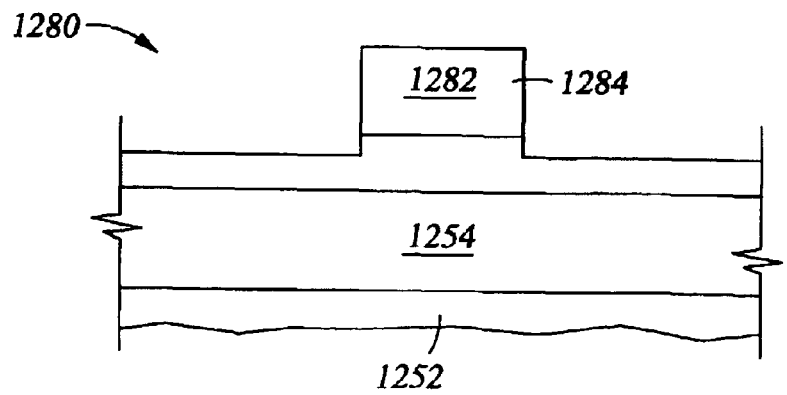
FIG. 12 is a cross section of an alternative core structure of an optical device.

FIG. 11 illustrates another core structure referred to as an over etch core structure 1170. The over etch core structure 1170 is so named because the core pattern step continues through the core layer to the underlying cladding resulting in a core layer 1172 formed over a raised cladding layer 1174. FIG. 12 represents a ribbed core structure 1280. In contrast to the over etch core structure 1270, etching/pattering of core structure 1282 results by stepping the etching/patterning process before etching through the core layer to the under lying cladding. The pattering etching process for a ribbed core structure, such as core structure 1280, is stopped so that resulting core layer 1282 comprises a raised section 1284.

In addition while square or generally rectangular cross section core structure have been illustrated, it is to be appreciated that other cross section shapes such as faceted corners, curved sides and circular cross sections are intended within the scope of the invention.

What is claimed is:

1. A method of fabricating multiple optical devices on a substrate, comprising:

positioning a substrate in a first processing chamber;

depositing a lower cladding on the substrate;

densifying the deposited lower cladding;

positioning the substrate in a second processing chamber;

depositing a core layer an the lower cladding;

patterning and etching the core layer to define a pattern of optical devices;

positioning the substrate in a third processing chamber; and depositing an upper cladding over the patterned optical devices.

2. The method of claim 1 wherein the utilization of the substrate is greater than about 75%.

3. The method of claim 1 wherein the substrate is 400 mm by 500 mm.

4. The method of claim 1 wherein the substrate has an area of about 400 cm$^2$ or greater.

5. The method of claim 1 wherein the substrate is a TFT panel.

6. The method of claim 1 wherein the substrate is made of a material selected from the group consisting of quartz, silica, fused silica or combinations thereof.

7. The method of claim 1 wherein the depositing a lower cladding and the densifying the lower cladding are performed on the same processing system.

8. The method of claim 1 wherein the upper cladding is densified following deposition thereof.

9. The method of claim 1 wherein the substrate defines one or more die and the die have one or more optical devices formed thereon and further have a major dimension greater than a minor dimension.

10. The method of claim 9 wherein the devices formed on a single die cover an area of at least about 400 cm$^2$.

11. The method of claim 9 wherein a single die comprising one or more optical devices has a shape similar to the substrate.

12. The method of claim 9 wherein the deposition steps are performed in one or more processing systems wherein each deposition step requiring densification is performed on a system having at least one deposition chamber and at least one densification chamber.

13. The method of claim 9 wherein the die and the substrate have the same form factor.

14. The method of claim 9 wherein at least two sides of a die of the one or more die are parallel to at least two sides of the substrate on which the die are formed.

15. The method of claim 1 wherein the lower cladding is made of a material selected from the group consisting of USG, undoped silica, and combinations thereof.

16. The method of claim 15 wherein the core layer is made of a material selected from the group consisting of PSG, GeO$_2$, SiON, Si$_3$N$_4$, and silicon.

17. The method of claim 16 wherein the upper cladding is made of a material selected from the group consisting of BPSG.

18. A method for forming a portion of an optical device on a substrate, comprising:
   positioning a substrate in a first deposition chamber on a processing system;
   depositing a lower cladding layer on the substrate;
   positioning the substrate in a densification chamber on the same processing system and treating the substrate therein;
   positioning the substrate in a second deposition chamber to deposit a core layer on the lower cladding layer; and then
   positioning the substrate in the densification chamber on the processing system and treating the substrate therein.

19. The method of claim 18 wherein the lower cladding layer comprises USG and the core layer comprises PSG.

20. The method of claim 19 wherein treating the substrate in the densification chamber comprises exposing the substrate to a rapid thermal anneal process.

21. The method of claim 20 wherein the substrate is heated to a temperature above about 1000° C.

22. The method of claim 20 further comprising performing lithography steps on the substrate to define a core pattern and then depositing an upper cladding on the core pattern and then treating the substrate in a densification chamber.

23. The method of claim 22 wherein the substrate has an area of at least about 400 cm$^2$.

24. The method of claim 23 wherein the substrate has a major side longer than a minor side.

25. The method of claim 23 wherein the substrate is made of a material selected from the group consisting of quartz, silica, and fused silica.

* * * * *

UNITED STATES PATENT AND TRADEMARK OFFICE
CERTIFICATE OF CORRECTION

PATENT NO. : 7,087,179 B2  
APPLICATION NO. : 09/734950  
DATED : August 8, 2006  
INVENTOR(S) : Mak et al.

Page 1 of 1

It is certified that error appears in the above-identified patent and that said Letters Patent is hereby corrected as shown below:

Column 4, Line 21: After "glass", insert --panels, e.g., quartz,--

Column 7, Line 46: Change "inputloutput" to --input/output--

Column 8, Line 29: Change "andlor" to --and/or--

Column 10, Line 2: Change "maybe" to --may be--

Column 11, Line 33: Before "cladding", change "an" to --a--

Column 16, Line 15: After "reference", insert --to--

Column 16, Line 33: Change "under lying" to --underlying--

Signed and Sealed this

Second Day of January, 2007

JON W. DUDAS  
*Director of the United States Patent and Trademark Office*